United States Patent [19]

Harrigan et al.

[11] Patent Number: 4,589,736
[45] Date of Patent: May 20, 1986

[54] TWO ROW REDUCTION/ENLARGEMENT GRADIENT INDEX LENS ARRAY HAVING SQUARE-ENDED FIBERS

[75] Inventors: Michael E. Harrigan, Webster; James D. Rees, Pittsford; Melvin E. Deibler, Williamson, all of N.Y.

[73] Assignee: Xerox Corporation, Stamford, Conn.

[21] Appl. No.: 674,436

[22] Filed: Nov. 23, 1984

[51] Int. Cl.⁴ .......................... G02B 6/04; G02B 6/18; G03B 27/00
[52] U.S. Cl. .................. 350/413; 350/96.25; 350/96.27; 350/96.31; 350/417; 355/1
[58] Field of Search ............... 350/413, 96.24, 96.25, 350/96.27, 96.29, 96.30, 96.31, 417

[56] References Cited

U.S. PATENT DOCUMENTS

| | | | |
|---|---|---|---|
| 3,658,407 | 4/1972 | Kitano et al. | 350/96.31 |
| 4,331,380 | 5/1982 | Rees et al. | 350/96.25 |
| 4,462,662 | 7/1984 | Lama | 350/413 |

OTHER PUBLICATIONS

"Gradient-Index Optics: A Review", by Duncan T. Moore, *Applied Optics*, Apr. 1 1980, vol. 19, No. 7, pp. 1035-1038.

"Reduction/Enlargement Gradient-Index Lens Array", by James D. Rees and William Lama in *Applied Optics*, Jun. 1 1984, vol. 23, No. 11, pp. 1715-1724.

*Primary Examiner*—John K. Corbin
*Assistant Examiner*—Scott J. Sugarman

[57] ABSTRACT

A reduction/enlargement gradient index lens array is provided which comprises several groups of square-ended fibers, the fibers within a particular group being of the same length. Group fiber length decreases generally from center to the ends of the array. The group are assembled in a characteristic fan-like fashion to form a reduction/enlargement lens array.

5 Claims, 7 Drawing Figures

TWO ROW REDUCTION/ENLARGEMENT GRADIENT INDEX LENS ARRAY HAVING SQUARE-ENDED FIBERS

BACKGROUND AND PRIOR ART STATEMENT

The present invention relates to gradient index optical fibers and more particularly, to a two-row bundled array of such fibers, the fibers arranged in groups having square ends and identical lengths, the fiber lengths differing by group and forming a lens array which transmits an image of an object at an object plane to an image plane at magnifications other than unity.

Image transmitters comprising bundled gradient index optical fibers are known in the art. U.s. Pat. No. 3,658,407 describes a light conducting fiber made of glass or synthetic resin which has a refractive index distribution in a cross-section thereof that varies parabolically outward from a center portion thereof. Each fiber acts as a focusing lens to transmit part of an image of an object placed near one end. An assembly of fibers, in a staggered two-row array, transmits and focuses an image, at 1:1 magnification, of the object. The fiber lenses are produced under the trade name "SELFOC"; the mark is registered in Japan and owned by Nippon Sheet Glass Co., Ltd..

Numerous techniques are known in the art for manufacturing glass or plastic fibers with gradient refractive indices. These are usefully summarized in an article entitled "Gradient-index optics: a review" by Duncan T. Moore, *Applied Optics*, April 1, 1980, Vol. 19, No. 7, pp. 1035–1038.

It is also known in the art to construct a gradient index lens array capable of forming reduced or enlarged images of a document. Such a lens array is disclosed in U.S. Pat. No. 4,331,380 and in an article entitled "Reduction/enlargement gradient-index lens array" by James D. Rees and William Lama in *Applied Optics*, June 1, 1984, Vol. 23, No. 11, pp. 1715–1724. As disclosed in the patent, specific designs are provided for a one-row fiber array and for various two-row designs.

In one embodiment, shown in FIG. 13A of U.S. Pat. No. 4,331,380, a single row array is made by making all of the fibers with square-ended, rather than curved faces. "Square-ended" means that the end face of each fiber is planar and perpendicular to the fiber axis. This design requires each of the 200 or so gradient index fibers to be of a different specific length. The manufacturing of these fibers and their assembly is costly and time-consuming since each fiber must be formed separately at the required length and ground and polished separately.

It is therefore one object of the present invention to provide an improved embodiment of a reduction/enlargement gradient index lens array of a square-ended configuration. It is a further object to reduce the cost of manufacturing and assembly of the lens array. More specifically, the present invention relates to a reduction/enlargement lens array comprising a plurality of gradient index optical fibers each fiber having planar faces perpendicular to the fiber axis, with the fibers joined together to form at least a single row, said fibers formed into a plurality of groups, each fiber in each group having the same length with the fiber lengths in each grouping becoming progressively shorter with increasing distance from the center group of the lens array.

DRAWINGS

DESCRIPTION

Figure 1:
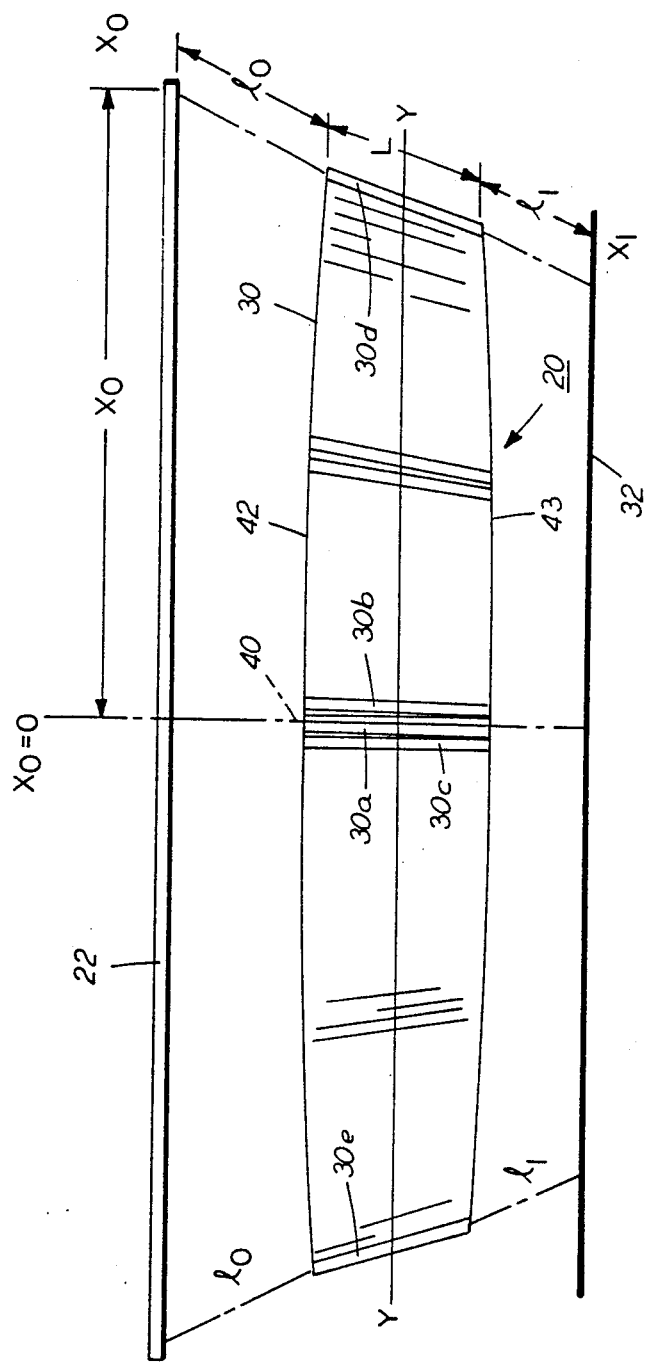
FIG. 1 is a frontal view of a prior art imaging system utilizing a one-row gradient index lens array having curved end faces.

Referring now to FIG. 1, there is shown a front view of a prior art one-row reduction gradient index lens array constructed according to the principles set forth in U.S. Pat. No. 4,331,380 whose contents are hereby incorporated by reference.

An object 22, which can be a document located in an object plane, is moved past lens array 20 in a direction extending into the page. An illumination means (not shown) provides intense illumination onto successive narrow strips of the document running parallel to the lens array (X-direction). Lens array 20 comprises a single row 30 of optical fibers. In operation, document 22 is moved past the illuminated area at a speed appropriate to the particular magnification and to the speed of image plane 32 which can be a photosensitive sheet, moving in the same direction as the document. Light reflected from the document is transmitted by lens aray 20 as a reduced image onto sheet 32. The reduced image is formed as a contiguous and overlapping plurality of reduced images from each individual fiber, as described more fully in U.S. Pat. No. 4,331,380.

For illustrative purposes, assume that document 22 is an A3 original (width=297 mm) which is to be reduced to A4 size (210 mm), i.e. lens 20 is a 0.707X lens. Lens array 20 comprises a plurality of individual gradient index fibers 30a, 30b, 30c, 30d, 30e, . . . which have the same radius, (e.g. 0.5 mm); the same axial index of refraction and the same index gradient. The fibers differ from each other in length and in orientation of the fiber axis and in the orientation of their end faces with respect to the object and image planes and in the orientation of their end faces with respect to their axes. As shown, fiber 30a at the center of the array ($X_o=0$) is in vertical orientation, i.e. its axis 40 is perpendicular to the object and image planes. The axes of adjoining fibers, i.e. 30b, 30c are slightly displaced from the perpendicularity condition, the displacement continuing out to the fibers at the ends of the array. The interfiber displacement value may be a constant value but other values are possible. The spaces 41 between fibers can be filled with a black silicone resin for light absorbing purposes, as is known in the art.

The light ray from the document that passes down the geometrical axis of an endmost fiber 30d (i.e. the central axial light ray for fiber 30d) images document point $X_o = 148.5$ mm at the reduced photoreceptor point $X_I = m_o X_o = 105.00$ mm, where $m_o$ is the desired magnification (0.707). The relationship $X_I = m_o X_o$ is maintained for the central axial ray passing through each fiber of the array, and the object and image vertex distances ($l_o$, $l_I$) are chosen to provide the correct magnification near the central axial ray of each fiber.

The lens assembly, as a whole, lies in a vertical plane which is perpendicular to the object plane but the lens is comprised of a plurality of fibers with a plurality of axes, each axis, save the axis of a central fiber, forming a different angle with respect to a line normal to the object plane.

This orientation results in the total object-to-image distance of the light path through each fiber changing from a first value at the center fiber to progressively higher values at the endmost fibers. To accommodate this change, the lengths of the fibers are progressively decreased from the center outward. A grinding and polishing operation results in the formation of the two smooth convex faces 42, 43.

Figure 2:
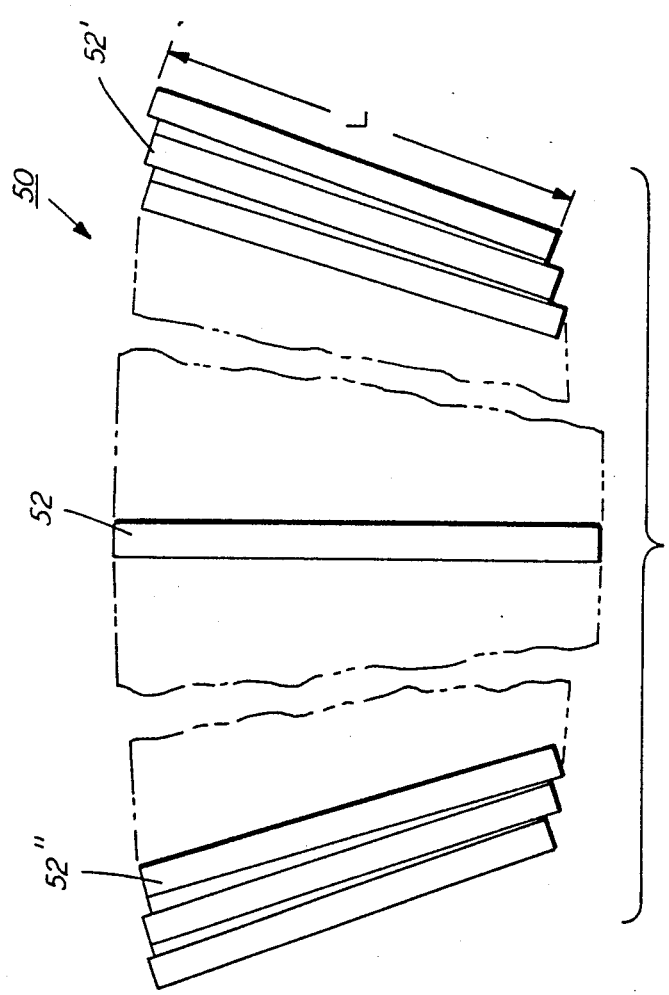
FIG. 2 is a frontal view of a prior art alternate embodiment of the FIG. 1 system wherein all of the fibers comprising the array have square ends and varying lengths.

FIG. 2 shows a second embodiment of the FIG. 1 array wherein a lens array 50 is formed of a plurality of a gradient index optical fiber 52. Each fiber 53 is of a different length L with the fibers in the center having the longest length. (Since the array has two symmetrical halves however, two fibers, one in each half will have an identical length.) Fiber lengths decrease out to the ends of the array in accordance with the requirements for forming the reduction/enlargement length. With this embodiment, each fiber must be formed at the required length L and ground and polished prior to the line assembly process. Since there may be several hundred fibers in a typical array, this is a time-consuming and costly process. In a typical manufacturing process, this requires hundreds of fiber batches to be prepared, stored and operated upon.

According to the principles of the present invention, it has been found that an improved square-ended embodiment can be formed using groups of fibers, each fiber in each group having identical lengths, the fiber lengths differing by groups. Although the teachings of the aforementioned U.S. Pat. No. 4,331,380 assume an incremental fiber-by-fiber change in length, it has been found that, because of the small total change in fiber length from the center of an array to the edge (typically less than 1 mm), a lens comprised of groupings of fibers of different lengths has sufficient depth of focus to tolerate some imaging "error" resulting from the slight deviation in each groups' fiber length. The advantages of forming a lens by using a small number of fiber groups, the fiber in each group having indentical lengths, are presented in further detail in a subsequent description of lens manufacturing assembly.

Figure 3:
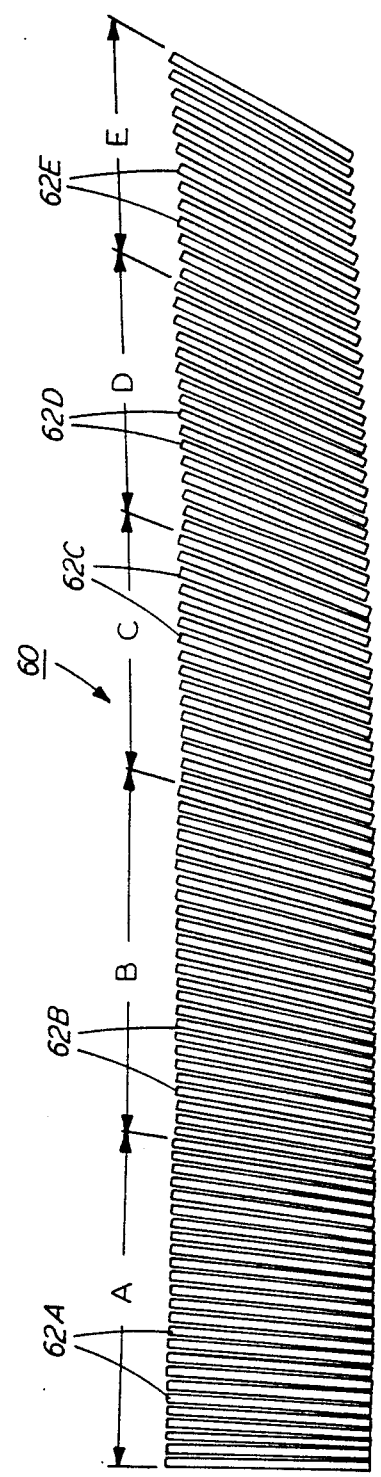
FIG. 3 is a front view of the right half of a square-ended, single row lens array design according to the present invention.

Referring now to FIG. 3, the right half of a single row lens array 60 (left half of array is symmetrical) comprises a plurality of optical fibers 62, each of the fibers forming part of a fiber grouping A, B, C, D, E. Fibers 62A forms grouping A, fibers 62B forms grouping B, etc.. Each fiber 62 has a planar face which is perpendicular to the fiber axis, e.g. is square-ended. Each fiber has the same length as other fibers in the same group but the fiber lengths of each group vary, with the fibers in group A having the longest length and the fibers in Group E having the shortest length. When these fibers are assembled in the characteristic fan-like orientation disclosed in the '380 patent, the fibers produce overlapping individual images which are resolved into a contiguous reduced or enlarged image, (depending upon the lens position and orientation) on an image plane.

While the one-row embodiment may provide sufficient exposure and exposure uniformity for certain systems, a two-row design may be required for those systems requiring more exposure and/or better exposure uniformity. The one-row design of FIG. 3 can be formed into a two-row design using the teachings set forth in copending U.S. Application Ser. No. 598,756 whose contents are hereby incorporated by reference. In that specification, it was disclosed that the gradient index fibers forming each row are aligned in the length direction so that the fiber axis lies along respective symmetrical planes. These planes are tilted with respect to each other and with respect to a plane normal to the object and image plane by a small angel. A further characteristic of this two-row configuration is that adjacent fibers in adjoining rows are offset to provide the required contiguous image at the image plane and to optimize the image quality.

Figure 4:
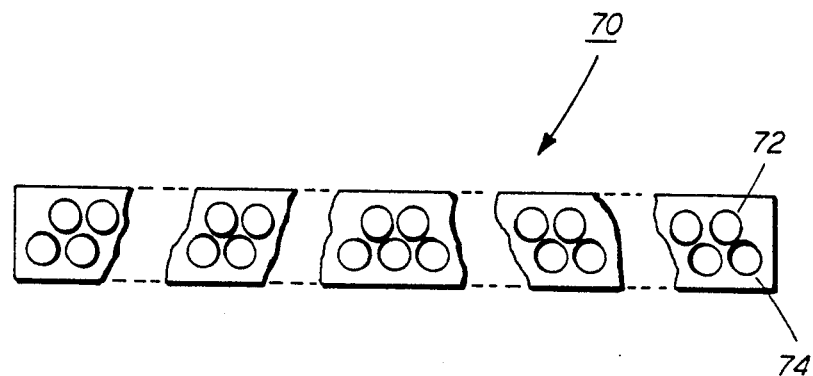
FIG. 4 is a top view of a two-row lens array design of the present invention.

A specific example of a two-row gradient index lens array according to the principles of the invention is shown in FIG. 4 with fiber values provided in the table. The lens array 70 comprises two rows of fibers 72 and 74. Row 72 and 74 each comprise 194 fibers. Each fiber has the following parameters: radius $R = 0.5325$; axial refractive index $N_o = 1.543$ at 500 nm; gradient constant $\sqrt{A} = 0.1277$ mm$^{-1}$ at 500 nm. The object vertex distance at the center is 20.10 nm; the image vertex distance (center) is 15.13 mm. The system is designed for a 0.770X magnification and has a total conjugate of 64.3 mm at 500 nm. The distance between the inage-side end faces of the two rows is 1.10 mm.

The following table lists the departure from the perpendicularity condition (tilt) for the fibers for ½ of each row (right half measured from the center; the left half of each row is symmetrical). The table also lists the fiber lengths for each row. As shown, and according to the principles of the present invention, in row 72, the fiber lengths of fibers 0–24 are all 29.07 mm. Thus, considering the center fiber grouping of Group A of FIG. 3, the 48 fibers comprising the center group (adding the left, right and center fibers) all have identical lengths of 29.07 mm. The right half of Group B (fibers 25–49) have 24 fibers of length 28.90 mm, thus total Group B fibers also equal 49; Group C (fibers 50–67) would have 34 fibers; Group D (fibers 68–83) would have 30 and end Group E (fibers 84–97) would have 26 fibers. Row 2 has the same fiber length characteristics.

TABLE

| | Row No. 72 | | Row No. 74 | |
|---|---|---|---|---|
| FIBER | TILT (DEG) | LENGTH (MM) | TILT (DEG) | LENGTH (MM) |
| 0 | .00 | 29.07 | NONE | |
| 1 | .30 | 29.07 | .15 | 29.07 |
| 2 | .60 | 29.07 | .45 | 29.07 |
| 3 | .91 | 29.07 | .75 | 29.07 |
| 4 | 1.21 | 29.07 | 1.06 | 29.07 |
| 5 | 1.51 | 29.07 | 1.36 | 29.07 |
| 6 | 1.81 | 29.07 | 1.66 | 29.07 |
| 7 | 2.11 | 29.07 | 1.96 | 29.07 |
| 8 | 2.41 | 29.07 | 2.26 | 29.07 |
| 9 | 2.72 | 29.07 | 2.58 | 29.07 |
| 10 | 3.02 | 29.07 | 2.87 | 29.07 |
| 11 | 3.32 | 29.07 | 3.17 | 29.07 |
| 12 | 3.62 | 29.07 | 3.47 | 29.07 |
| 13 | 3.92 | 29.07 | 3.77 | 29.07 |
| 14 | 4.22 | 29.07 | 4.07 | 29.07 |
| 15 | 4.52 | 29.07 | 4.37 | 29.07 |

TABLE-continued

| FIBER | Row No. 72 TILT (DEG) | Row No. 72 LENGTH (MM) | Row No. 74 TILT (DEG) | Row No. 74 LENGTH (MM) |
|---|---|---|---|---|
| 16 | 4.82 | 29.07 | 4.67 | 29.07 |
| 17 | 5.12 | 29.07 | 4.97 | 29.07 |
| 18 | 5.42 | 29.07 | 5.27 | 29.07 |
| 19 | 5.72 | 29.07 | 5.57 | 29.07 |
| 20 | 6.02 | 29.07 | 5.87 | 29.07 |
| 21 | 6.31 | 29.07 | 6.17 | 29.07 |
| 22 | 6.61 | 29.07 | 6.46 | 29.07 |
| 23 | 6.91 | 29.07 | 6.76 | 29.07 |
| 24 | 7.21 | 29.07 | 7.06 | 29.07 |
| 25 | 7.50 | 28.90 | 7.36 | 28.90 |
| 26 | 7.80 | 28.90 | 7.65 | 28.90 |
| 27 | 8.10 | 28.90 | 7.95 | 28.90 |
| 28 | 8.39 | 28.90 | 8.24 | 28.90 |
| 29 | 8.69 | 28.90 | 8.54 | 28.90 |
| 30 | 8.98 | 28.90 | 8.84 | 28.90 |
| 31 | 9.28 | 28.90 | 9.13 | 28.90 |
| 32 | 9.57 | 28.90 | 9.42 | 28.90 |
| 33 | 9.86 | 28.90 | 9.72 | 28.90 |
| 34 | 10.16 | 28.90 | 10.01 | 28.90 |
| 35 | 10.45 | 28.90 | 10.30 | 28.90 |
| 36 | 10.74 | 28.90 | 10.60 | 28.90 |
| 37 | 11.03 | 28.90 | 10.89 | 28.90 |
| 38 | 11.32 | 28.90 | 11.18 | 28.90 |
| 39 | 11.61 | 28.90 | 11.47 | 28.90 |
| 40 | 11.90 | 28.90 | 11.76 | 28.90 |
| 41 | 12.19 | 28.90 | 12.05 | 28.90 |
| 42 | 12.48 | 28.90 | 12.33 | 28.90 |
| 43 | 12.77 | 28.90 | 12.62 | 28.90 |
| 44 | 13.05 | 28.90 | 12.91 | 28.90 |
| 45 | 13.34 | 28.90 | 13.20 | 28.90 |
| 46 | 13.62 | 28.90 | 13.48 | 28.90 |
| 47 | 13.91 | 28.90 | 13.77 | 28.90 |
| 48 | 14.19 | 28.90 | 14.05 | 28.90 |
| 49 | 14.48 | 28.90 | 14.34 | 28.90 |
| 50 | 14.76 | 28.70 | 14.62 | 28.70 |
| 51 | 15.04 | 28.70 | 14.90 | 28.70 |
| 52 | 15.32 | 28.70 | 15.18 | 28.70 |
| 53 | 15.60 | 28.70 | 15.46 | 28.70 |
| 54 | 15.88 | 28.70 | 15.74 | 28.70 |
| 55 | 16.16 | 28.70 | 16.02 | 28.70 |
| 56 | 16.44 | 28.70 | 16.30 | 28.70 |
| 57 | 16.72 | 28.70 | 16.58 | 28.70 |
| 58 | 16.99 | 28.70 | 16.86 | 28.70 |
| 59 | 17.27 | 28.70 | 17.13 | 28.70 |
| 60 | 17.54 | 28.70 | 17.41 | 28.70 |
| 61 | 17.82 | 28.70 | 17.68 | 28.70 |
| 62 | 18.09 | 28.70 | 17.96 | 28.70 |
| 63 | 18.36 | 28.70 | 18.23 | 28.70 |
| 64 | 18.64 | 28.70 | 18.50 | 28.70 |
| 65 | 18.91 | 28.70 | 18.77 | 28.70 |
| 66 | 19.18 | 28.70 | 19.04 | 28.70 |
| 67 | 19.44 | 28.70 | 19.31 | 28.70 |
| 68 | 19.71 | 28.50 | 19.58 | 28.50 |
| 69 | 19.98 | 28.50 | 19.85 | 28.50 |
| 70 | 20.25 | 28.50 | 20.11 | 28.50 |
| 71 | 20.51 | 28.50 | 20.38 | 28.50 |
| 72 | 20.78 | 28.50 | 20.64 | 28.50 |
| 73 | 21.04 | 28.50 | 20.91 | 28.50 |
| 74 | 21.30 | 28.50 | 21.17 | 28.50 |
| 75 | 21.56 | 28.50 | 21.43 | 28.50 |
| 76 | 21.82 | 28.50 | 21.69 | 28.50 |
| 77 | 22.08 | 28.50 | 21.95 | 28.50 |
| 78 | 22.34 | 28.50 | 22.21 | 28.50 |
| 79 | 22.60 | 28.50 | 22.47 | 28.50 |
| 80 | 22.86 | 28.50 | 22.73 | 28.50 |
| 81 | 23.11 | 28.50 | 22.99 | 28.50 |
| 82 | 23.37 | 28.50 | 23.24 | 28.50 |
| 83 | 23.62 | 28.50 | 23.50 | 28.50 |
| 84 | 23.87 | 28.30 | 23.75 | 28.30 |
| 85 | 24.13 | 28.30 | 24.00 | 28.30 |
| 86 | 24.38 | 28.30 | 24.25 | 28.30 |
| 87 | 24.63 | 28.30 | 24.50 | 28.30 |
| 88 | 24.88 | 28.30 | 24.75 | 28.30 |
| 89 | 25.12 | 28.30 | 25.00 | 28.30 |
| 90 | 25.37 | 28.30 | 25.25 | 28.30 |
| 91 | 25.62 | 28.30 | 25.49 | 28.30 |
| 92 | 25.86 | 28.30 | 25.74 | 28.30 |
| 93 | 26.11 | 28.30 | 25.98 | 28.30 |
| 94 | 26.35 | 28.30 | 26.23 | 28.30 |
| 95 | 26.59 | 28.30 | 26.47 | 28.30 |
| 96 | 26.83 | 28.30 | 26.71 | 28.30 |
| 97 | 27.07 | 28.30 | 26.95 | 28.30 |

Figure 5:
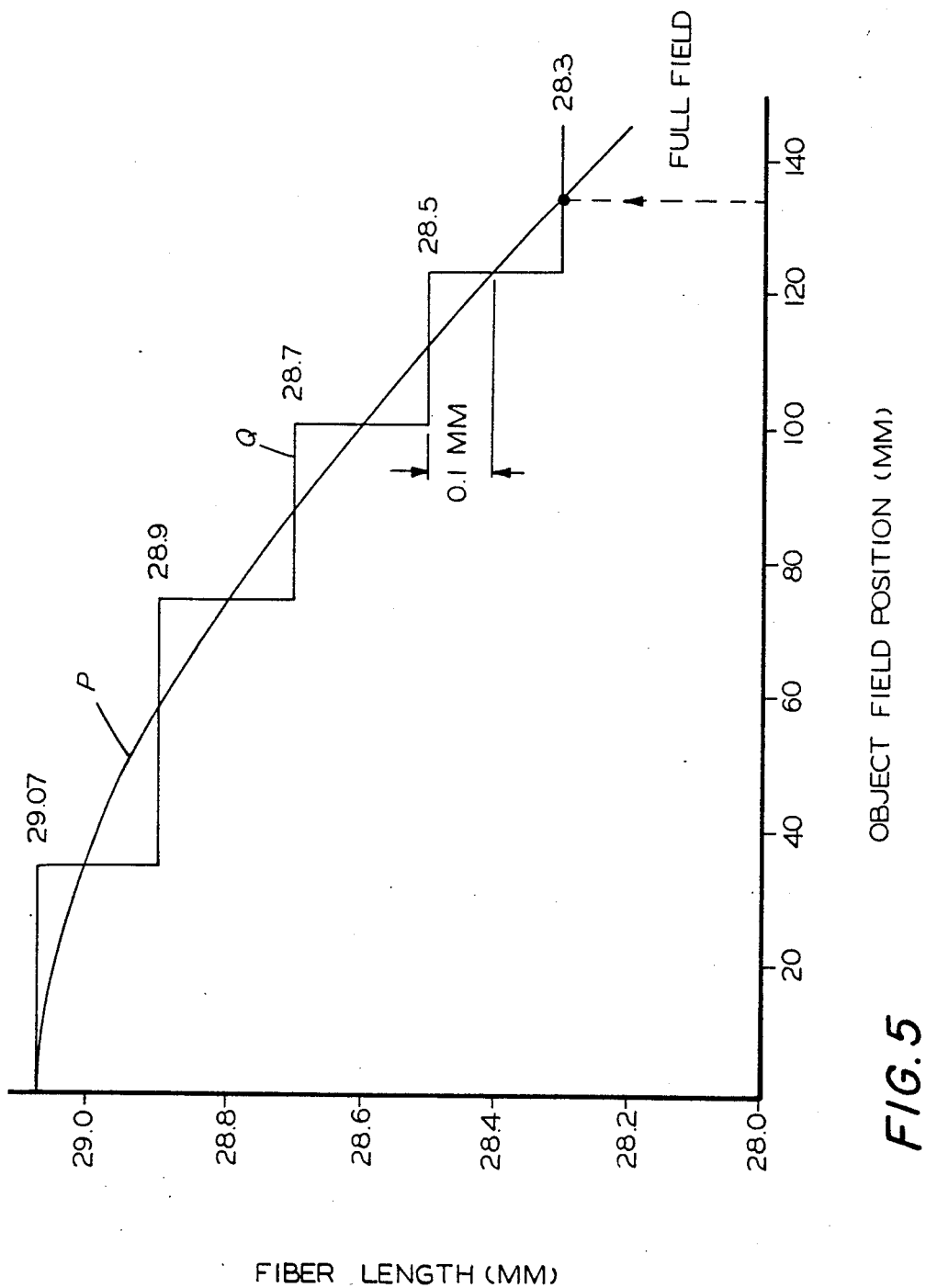
FIG. 5 is a graph comparing fiber length versus object field position for the FIGS. 2 and 3 design.

Referring not to FIG. 5, there is shown a graph of fiber lengths vs. object field position. Plot P represents a single row of tilted fibers, each fiber having the same basic parameter as the fibers in the table but each fiber being of the exact length required by the array equation of the aforementioned U.S. Pat. No. 4,331,380 patent. Plot Q represents row 72 or 74 of array 70 and results in a step graph with each "step" representing the number of fibers in the particular group. As is evident, the central fibers in each group coincide with Plot P but the other fibers are close enough to the idealized curved path of Plot P (½ above, ½ below and within 0.1 mm) so that performance is only slightly degraded.

It is to be noted in connection with FIG. 5, that the center fibers and the end fiber (the last fiber at full field) have the exact length solution (plot P). There may be variations as to which fibers are selected to have the "exact" solution but it is preferable that the end fibers are so selected since the image quality at the edge of the field falls off more rapidly as the object position increases.

Several observations can be made about the data shown in the table and in FIG. 5.

1. The lens array comprises a total of 389 fibers in both rows but fibers of only five lengths are required. The advantages of this characteristic in first making the lenses and then assembling them are set forth below.

2. There is only 0.77 mm difference between the length of fibers in center Group A and those in end Group E. This small difference does not adversely affect the image quality.

3. There is no more than a 0.1 mm difference between a given fiber length in plot Q and the plot P curve or, alternatively, no more than a 0.2 mm difference between adjacent group fiber lengths. By maintaining the change per group length within these parameters, the optimum number of groups for the particular system was found to be five. In other words, given a 0.77 inch center-to-edge variation, a five-fiber length grouping is appropriate for this system. A greater number of groups would only slightly improve image. A lesser number would degrade image quality. Other systems having greater of less center-to-edge distance however, would require a larger or smaller number of groups, respectively in maintaining the same degree of image quality.

4. According to another aspect of the invention the number of fibers in each group progressively decreases towards the array end. This is due to the fact that the P plot curve is steeper near the edge; therefore, to maintain the 0.1 mm average distance described in 3 above, less fibers make up a group. Analysis shows that exposure uniformity is better from center-to-edge than the FIG. 1 embodiment.

Figure 6:
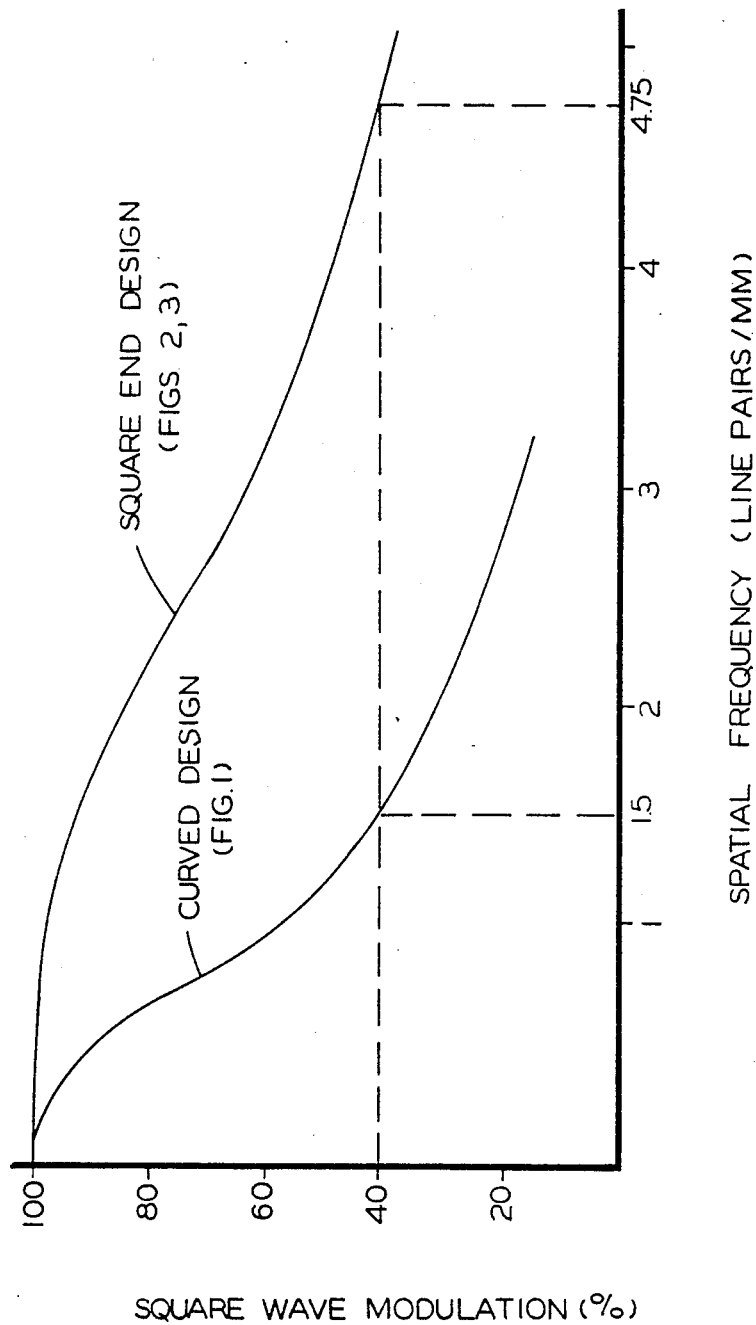
FIG. 6 is a graph of spatial frequency versus MTF for a prior art curved surface compared to the square-ended lens array of the present invention.

Turning now to FIG. 6, the imaging performance two-row design set forth in the table was compared to a previous curved face design of the same magnification to the squre-ended embodiments of FIGS. 2 and 3. The MTF vs. frequency comparison for extreme object points (worst case) shows an improvement in the 5-length square-ended design over the curved face design. For example, at 40% MTF, the curved design has a frequency of approximately 1.5 lp/mm while the square-ended design has frequency of approximately 4.75 lp/mm; a decided improvement in imaging performance.

Consider next the advantage of assembling a reduction/enlargement gradient index lens array with fibers having a small number of different lengths. The first advantage is realized in the processing of the fibers themselves. With the curved design (FIG. 1), the fibers, when assembled into the array design, require very precise cylindrical polishing and grinding operations which have proved to be expensive and time consuming. With the FIG. 2 embodiment, fibers must be separately cut into many required lengths (typically up to 200) and the end faces polished and ground to the required planar configuration. With the present design however, optical fiber strands are cut into a small number of lengths (5 different lengths according to the instant example). Each of the five fiber groupings can then be bundled together and each face subjected to a single flat grinding and polishing operation. The economics in finishing the ends of 1/5 of the required fibers by the single planar finish process are readily apparent. With this process, also, extra fibers of the required lengths can be added to the finishing process; any fiber which becomes chipped or broken can be discarded and replaced by a perfect fiber. With the curved design, the entire lens array would have to be discarded on breaking or chipping of a single fiber during the grinding process.

Another advantage is exemplified by the improved imaging performance shown in FIG. 6. This improvement can be attributed to the reduction of chromatic aberrations, coma and caused by distortions caused by the wedges of the non-perpendicular end face design.

The assembly procedures for the square-end design of the invention also lend themselves to a simplified procedure. A preferred manufacturing assembly would include the following steps.

1. The minimum number of groups which will provide the desired system exposure is determined (five for the present embodiment).

2. The five fiber groups are formed by cutting fiber strands into fibers of the required number and lengths.

3. Fibers from each group are formed into bundles and both sides subjected to a grinding and polishing operation until the desired planarity is achieved (e.g. each fiber face is perpendicular to the fiber axis).

4. An injection-molded plastic center piece is formed having tilted grooves on both sides designed to seat the fibers comprising each of the two rows. Two outside molded pairs are mounted to the center piece enclosing the spaces in which the fibers will be seated.

Figure 7:
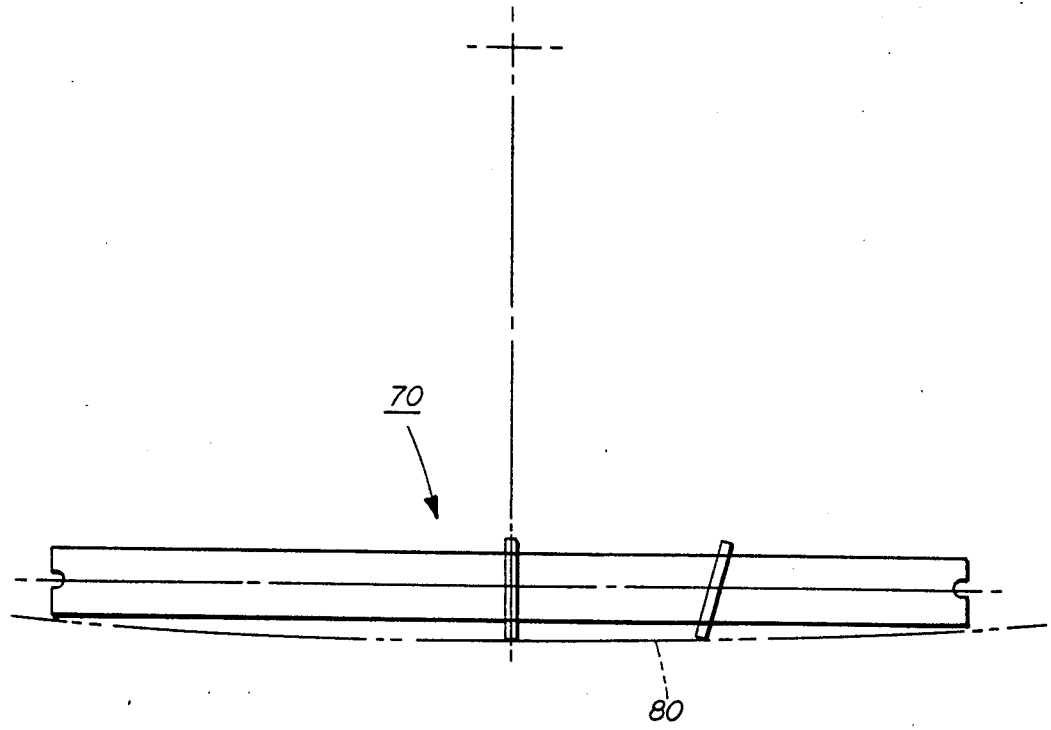
FIG. 7 is a side view showing the seating of the fibers during the assembly process.

5. As shown in FIG. 7 a template 80 is temporarily connected to the bottom of the array. The fibers are then introduced into the top of the array and allowed to descend by gravity coming to rest on the top surface of template 80. The template is designed so that each fiber will be seated in the exact position required by the lens design.

6. The two outer pairs are clamped together securing the fibers in their seated position. A black silicone resin is then drawn up through the interstitial spaces between the fibers by a vacuum process.

7. The resin is then cured and the array is sonic-cleaned.

In conclusion, it may be seen that there has been disclosed herein an improved reduction/enlargement gradient index lens array. The array is composed entirely of square-ended fibers arranged into several groups of identical fiber lengths, each group having fibers of a length different from the fiber lengths of the other groups. The array has much less aberrations. The process for preparing the fibers for assembly (cutting to length, grinding and polishing of end faces) is improved over the process required for the other prior art designs. The manufacturing process is relatively simple and inexpensive.

The embodiments described herein are presently considered to be preferred; however it is contemplated that further variances and modifications within the purview of those skilled in the art can be made. For example, while the two-row lens array described in the example consists of five fiber lengths, lenses or greater or less groupings may be used dependent on system image quality requirements. The economics attendant the assembly and manufacturing, however, are fully realized with the minimum number of fiber lengths consistent with image quality requirements.

The following claims are intended to cover all such variations and modifications.

What is claimed is:

1. A reduction/enlargement lens array comprising a plurailty of gradient index optical fibers arranged in a fan-like configuration each fiber having planar faces perpendicular to the fiber axis, with the fibers joined together to form at least a single row, said fibers formed into a plurality of groups, each fiber in each group having the same length with the fiber lengths in each group becoming progressively shorter with increasing distance from the center group of the lens array.

2. The lens array of claim 1 wherein the fibers are formed into a two-row array.

3. The lens array of claim 1 wherein the changes in fiber length from group to group are within 0.2 mm.

4. An optical system for transmitting an image of an object lying in an object plane onto a parallel image plane at a magnification other than unity, said system comprising a gradient index lens array having a plurality of gradient index optical fibers aligned in a fan-like configuration in two rows, said array characterized by each row comprising several groups of fibers all fibers in each group having the same length, each fiber having a planar surface which is perpendicular to the fiber axis, and wherein the fiber lengths in one group differ from the fiber lengths in other groups in such a way that the fiber lengths in each group become progressively shorter with increasing distance from the center group of the lens array.

5. A method of assembling a two-row, square-ended reduction/enlargement lens array comprising the steps of:

(a) determining the minimum number of fiber groups to provide the exposure requirement of the specific system, (b) cutting the fibers to form each group of the required lengths, (c) grinding and polishing the end faces of each group of fibers until the desired planarity is achieved, (d) forming a center piece having tilted grooves on the outer surfaces to seat the fibers comprising each of the rows, (e) fitting outside members to the center piece to form the spaces in which the fibers will be seated, the combination of the center and the outside members forming the lens array frame, (f) seating the fibers through the top of the array frame, (g) placing a template adjacent the bottom of the array and allowing the fibers to come to rest on the top surface of the template, the template designed so that each fiber will be seated in the exact position required by the lens design, and (h) bonding the fibers into place.

* * * * *